June 28, 1955 P. M. JOHNSON 2,712,071

TUNABLE CAVITY RESONATORS

Filed Dec. 13, 1949 4 Sheets-Sheet 1

INVENTOR
PHILIP M. JOHNSON
BY Elmer J. Gorn
ATTORNEY

June 28, 1955 P. M. JOHNSON 2,712,071

TUNABLE CAVITY RESONATORS

Filed Dec. 13, 1949 4 Sheets-Sheet 2

INVENTOR
PHILIP M. JOHNSON

BY Elmer J. Gorn

ATTORNEY

June 28, 1955 P. M. JOHNSON 2,712,071

TUNABLE CAVITY RESONATORS

Filed Dec. 13, 1949 4 Sheets-Sheet 3

INVENTOR
PHILIP M. JOHNSON
BY Elmer J. Gorn
ATTORNEY

June 28, 1955 P. M. JOHNSON 2,712,071

TUNABLE CAVITY RESONATORS

Filed Dec. 13, 1949 4 Sheets-Sheet 4

INVENTOR
PHILIP M. JOHNSON
BY Elmer J. Gorn
ATTORNEY

United States Patent Office 2,712,071
Patented June 28, 1955

2,712,071

TUNABLE CAVITY RESONATORS

Philip M. Johnson, Albuquerque, N. Mex., assignor to Raytheon Manufacturing Company, Newton, Mass., a corporation of Delaware Application December 13, 1949, Serial No. 132,681
5 Claims. (Cl. 250—36)

This application relates to cavity resonators, and more particularly to tunable cavity resonators of a type adapted for use with a klystron for developing microwave energy.

To vary the frequency of a klystron oscillator over wide ranges, the resonant cavity associated therewith must have its resonant frequency varied. In addition, the voltage applied to the repeller electrode must be varied with the frequency for maximum power output of the klystron. Therefore, in order to produce an oscillator which will reliably operate over a wide range of frequencies without the use of measuring devices to determine the correct operating conditions, it is necessary that the repeller voltage be tracked with the tuning structure of the resonator.

Applicant has discovered a particular arrangement adapted to produce this tracking with a high degree of accuracy, reliability and durability. Further, applicant's device provides a tuning arrangement whereby the frequency settings on a dial attached to the tuning control of the cavity resonator may be linearly spaced. This is accomplished by means of a cam which actuates the tuning element and a control potentiometer for applying a variable voltage to the repeller electrode, the movable arm of said potentiometer being ganged to the follower of said cam.

In order to produce a compact and rugged structure, applicant has devised a cavity resonator in coaxial form with the tuning elements and the cam coaxial with the cavity resonator. In addition, applicant has provided an adjustment whereby the position of the cam follower on the cam surface may be varied slightly for a given position of the potentiometer arm to thereby adjust the tracking between the tuning element and an indicating dial attached to the potentiometer.

A particular embodiment of this invention will now be described in detail, reference being had to the accompanying drawings wherein.

Figure 1:
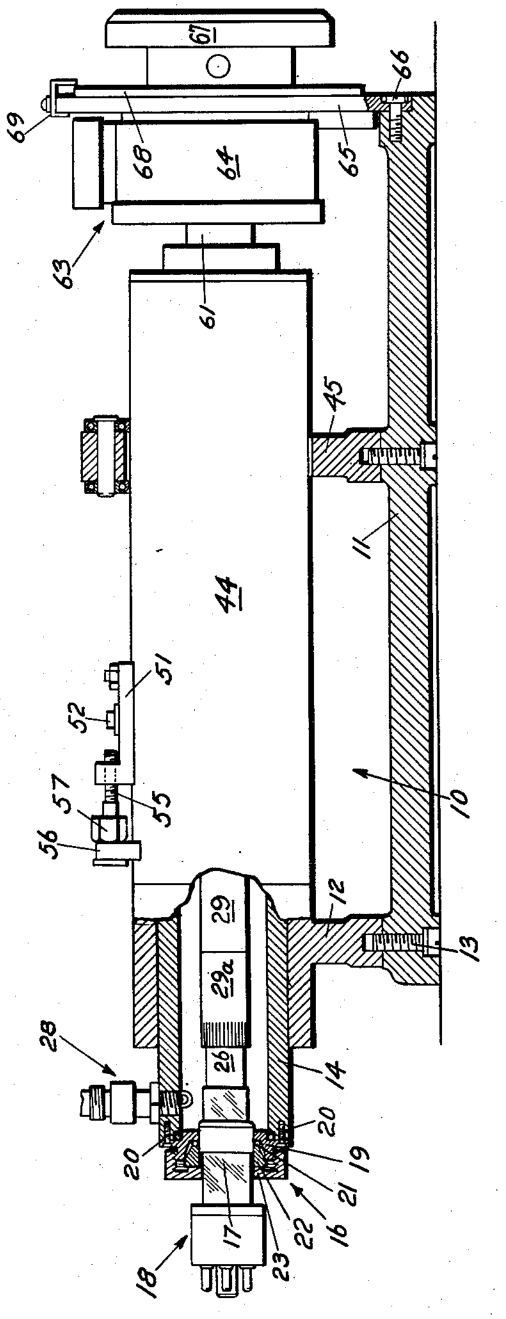
Fig. 1 illustrates a partially broken away front elevation view of a cavity resonator embodying this invention and illustrating the details of the mounting of a klystron tube in said cavity resonator.
Figure 2:
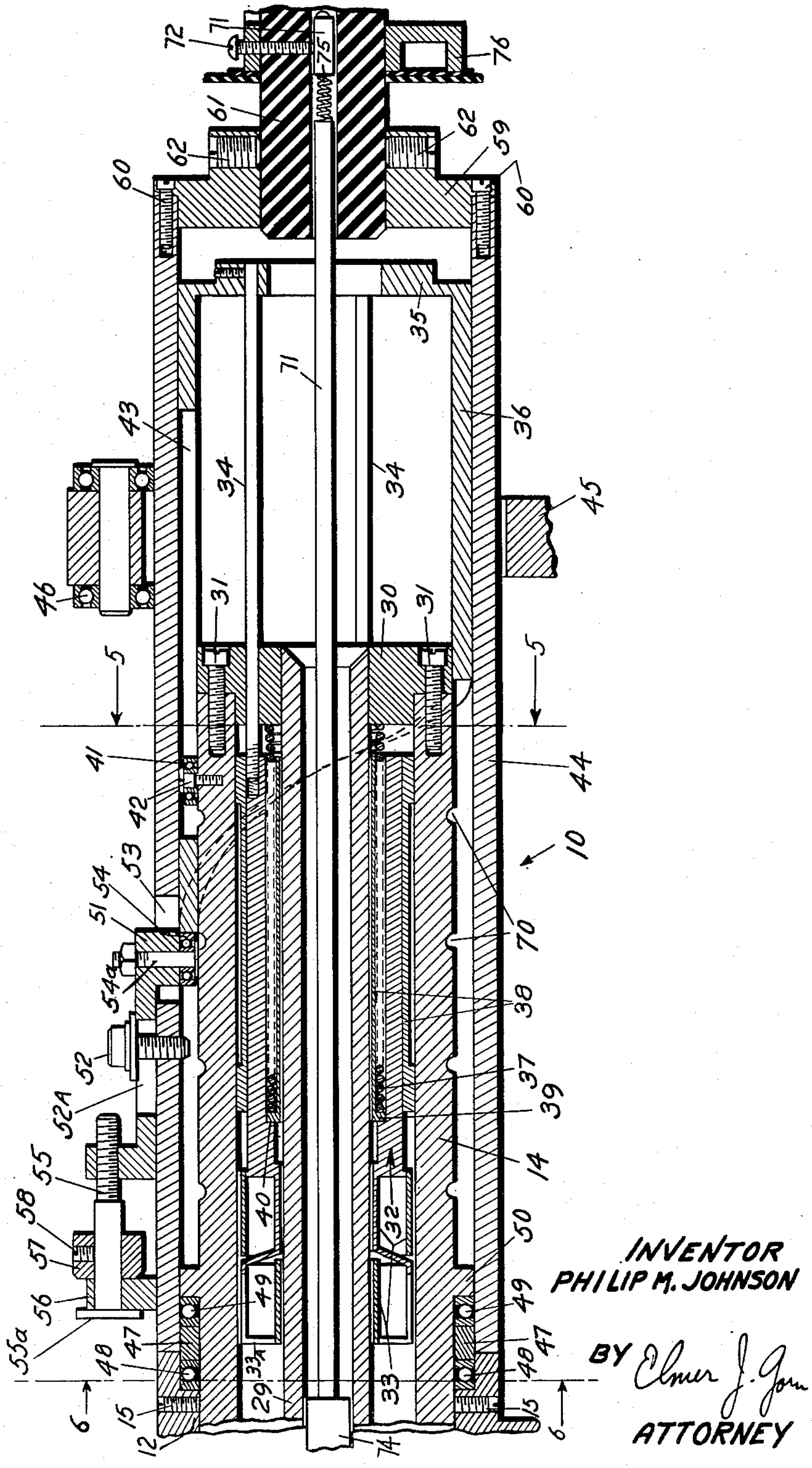
Fig. 2 illustrates a longitudinal, cross-sectional view of the central portion of the device shown in Fig. 1 taken along line 2—2 of Fig. 5.

Referring now to Figs. 1 and 2, there is shown a cavity resonator 10 having a supporting base 11. At one end of base member 11 there is attached a support member 12 having a cylindrical hole therein, member 12 being attached to member 11 by a screw 13. The axis of the hole in member 12 extends parallel to base member 11. Support member 12 contains therein a cylinder 14 coaxial therewith which forms the outer member of the coaxial cavity resonator. Cylinder 14 is rigidly fixed with respect to support member 12 by a plurality of set screws 15 extending through support member 12 and engaging cylinder 14. One end of cylinder 14 extends outwardly beyond the end of base member 11 and terminates in a cap assembly 16 designed to engage the lower grid 17 of the velocity modulation chamber of a klystron 18. The cap assembly 16 comprises an annular disk 19 attached to the end of cylinder 14 by screws 20, said disk 19 having a hole therein sufficient to allow the entrance of member 17. Resting against the outer side of member 19 and snugly engaging member 17 is a resilient wire coil 21 of spring-like material which is urged against member 19 by an annular wedge-shaped member 22 and a cap member 23 threaded onto member 19. Compression of wire spring 21 by the wedge member 22 causes circumferential expansion thereof both outwardly and inwardly, thereby firmly grasping the member 17.

Klystron 18 is of the well-known reflex type having a single modulation chamber comprising upper and lower modulation grids 17 and 26. Above upper grid 26 there is positioned a repeller electrode 27 comprising a rod having a cup-shaped depression in the end thereof adjacent grid 26. Below lower grid 17 there is positioned a control grid 24 and below control grid 24 is a cathode 25.

In one side of cylinder 14 there is inserted an output coupling 28 comprising an outer shield member threaded into the wall of cylinder 14. Extending through the shield member and coaxial therewith is a central conductor whose inner end is formed into a pickup loop and attached to the inner end of shield member 28.

Contacting member 27 and coaxial therewith is a spring clip member 29*a* of a well-known type which is attached to a cylinder 29 coaxial with cylinder 14 and considerably smaller in diameter than cylinder 14. Cylinder 29 extends from upper grid 26 through cylinder 14 and is rigidly attached to an end plate 30 as, for example, by welding. End plate 30, in turn, is rigidly attached to cylinder 14 by means of screws 31.

In the space between cylinders 14 and 29 and coaxial therewith there is positioned a tuning element 32 comprising a plunger which is movable with respect to cylinders 29 and 14. Tuning element 32 contains at the end thereof adjacent klystron 18 a structure which acts as a shorting bar between cylinders 29 and 14. This structure comprises a plurality of cylinders 33 which are spaced slightly from the walls of cylinders 29 and 14 and are coaxial therewith and which operate as wave traps by having their lengths made on the order of a quarter wave length of the operating frequency. Since cylinders 33 are spaced from the walls of cylinders 14 and 29, the inner ends thereof behave as open circuits with respect to cylinders 29 and 14, thereby creating the equivalent of short circuits at the other ends of cylinders 33. The lower outermost ends of cylinders 33 contain longitudinal slots 33*a* therein to damp spurious oscillations in the shorting structure. Since the structure 33 does not touch the walls of cylinders 14 and 29, as is the case with standard spring contact shorting bars, erratic operation of the shorting structure due to poor contact is eliminated.

The opposite end of tuning structure 32 from klystron 18 terminates in a plurality of rods 34 which extend through and are slidable in end member 30. Rods 34, after passing through member 30, are attached to an end plate 35 by means of set screws.

End plate 35 is an integral part of a cylindrical cam 36 which extends from end plate 35 toward klystron 18 over a portion of cylinder 14 and coaxial therewith.

Tuning element 32 is prevented from wobbling in the space between cylinders 14 and 29 by a pair of cylindrical insulating spacers 38 positioned between the outer and inner surfaces of element 32 and cylinders 14 and 29, respectively. Tuning element 32 is resiliently urged toward klystron 18 by a coil spring 37 coaxial with inner cylinder 29. One end of spring 37 engages end member 30 and the other end thereof passes between the inner insulator 38 and tuning element 32 and engages an annular lip on said insulator which, in turn, engages an annular lip on tuning element 32.

Rotary motion between cam member 36 and cylinder 14 is prevented by a ball-bearing guide member 41 rigidly attached to cylinder 14 by a screw 42. Guide member 41 engages a slot 43 in cylindrical cam 36, said slot being parallel to the axis of cylindrical members 14 and 29. Due to the slot 43, longitudinal motion of the cam 36 is permitted, and, due to the action of spring 37, tuning member 32, rods 34 and cam 36 are urged toward klystron 18, thereby decreasing the dimensions of the cavity surrounding klystron 18 and increasing the operating frequency of the klystron.

Surrounding cylindrical cam 36 is an outer cylinder 44 which rests in a second support member 45 attached to base member 11 and which carries a plurality of bearing members 46 which engage cylinder 44. One end of cylinder 44 has an inner ring 47 attached thereto which engages a ball-bearing raceway 48 which, in turn, engages a surface of support member 12. A second ball-bearing raceway 49 is positioned on the opposite side of ring 47 from raceway 48 and engages ring 47 and an annular lip 50 protruding from the outer surface of cylinder 14. By this bearing structure rotary motion of outer cylinder 44 is permitted but longitudinal motion thereof is prevented.

Cylinder 44 carries thereon a cam follower support member 51 rigidly attached thereto by a bolt 52 which passes through a hole **52*a* in member 51 and threadedly engages cylinder 44. Cam follower support member 51 extends through a slot 53 in cylinder 44 and has attached to its inner end a ball-bearing cam follower 54 by means of a bolt 54*a*, said cam follower engaging the cam surface of cylindrical cam 36 in opposition to the resilient bias produced by spring 37. Thus, it may be seen that when outer cylinder 44 is rotated cam follower 54 acting upon cylindrical cam 36 will produce a longitudinal motion of said cam which, in turn, moves tuning element 32 toward and away from klystron 18. Adjustment of the position of cam 36 with respect to the angular position of cylinder 44 is provided by making the position of cam follower member 51 adjustable longitudinally of cylinder 44. This is accomplished by making the hole 52*a* in member 51, through which bolt 52 passes, a slot, said slot having a major axis parallel to the axis of cylinder 44. Accurate adjustment of member 51 is produced by a threaded bolt 55 which engages a threaded hole in a portion of member 51. Bolt 55, which is parallel to the axis of cylinder 14, has an unthreaded portion which extends through a boss 56 attached to cylinder 44 as by welding. Longitudinal motion of member 55 in boss 56 is prevented by the bolthead 55*a* of bolt 55 which bears against boss 56 on one side thereof and by a nut 57 rigidly attached to member 55 by set screws 58, said nut bearing against the opposite side of boss 56. Thus, when bolt 52 is loosened and nut 57 turned, fine adjustment of member 51** is accomplished.

The other end of cylinder 44 which extends beyond cam 36 terminates in an end plate 59 rigidly attached to cylinder 44 by screws 60. End plate 59 contains a hole therein coaxial with cylinder 44 into which is inserted a cylindrical insulating member 61 which is rigidly held with respect to end plate 59 by means of set screws 62 extending through a portion of end plate 59 and engaging insulating member 61. Insulating member 61 extends into a potentiometer 63, which may be of any desired type which will track with the particular characteristics of the tube used. The outer case 64 of the potentiometer is attached to a bracket 65 which is rigidly attached to base member 11 by screws 66. Insulating member 61 extends through potentiometer 63 and is rigidly attached to a knob 67 and an indicating dial 68.

Inside case 64 there is a movable metal contact arm 76 which is rigidly attached to member 61 by a screw 72 which extends through and threadedly engages members 76 and 61. Arm 76 has attached thereto a resilient contact finger 77 which slidably contacts a wire wound resistance card comprising a sheet of insulating material 78 on which resistance wire 79 is wound. The insulating sheet 78 is bent into substantially cylindrical form such that the ends of wire 79 are adjacent each other. This resistance card is positioned around movable arm 76 and insulating member 61 adjacent the outer wall of case 64 such that rotation of knob 67 produces a corresponding change in the position of contact finger 77 on wire 79. The ends of wire 79 are connected to terminal lugs 80 which extend through the case 64, whereby a voltage may be impressed across resistance 79 in a manner more particularly described hereinafter. Thus, it may be seen that rotation of knob 67 causes rotation of both the movable arm of the potentiometer and cylinder 44, thereby causing simultaneous longitudinal movement of the plunger 32 in a manner previously described.

By way of example, for the particular klystron used herein, it has been found that for the frequency settings to be symmetrically spaced around the dial, which settings may be indicated by a pointer 69 attached to bracket 65, the cam surface should approximate a hyperbolic function and the potentiometer may have a wire wound resistance card which is substantially wedge shaped.

The cam is substantially hyperbolic for the following reasons. The operating wave length of the klystron varies proportionally with variations in the distance from the shorting structure 32 to the klystron.

This may be written as $$D+C=K\lambda \qquad (1)$$

Where:

$D$=Distance of the shorting structure to the klystron.
$K$=A proportional constant.
$\lambda$=Operating wave length.
$C$=A constant dependent on the klystron structure.

Since $$\lambda=\frac{V}{f} \qquad (2)$$

Where:

$V$=Velocity of wave propagation in the cavity.
$f$=The operating frequency.

Substitution for $\lambda$ in (1) gives $$D+C=K\frac{V}{f} \qquad (3)$$

Solving fan $f$ $$D+C=\frac{KV}{F} \qquad (4)$$

$$f=\frac{KV}{D+C} \qquad (5)$$

Since $f$ is to vary linearly with rotation of member 61

$$f=kx \qquad (6)$$

Where:

$x$=distance around cam 36.
$k$=Proportional constant.

Substituting in (5)

$$kx=\frac{KV}{D-C} \quad (7)$$

or $$x=\frac{C^1}{D-C} \quad (8)$$

Where $C^1$ is a combination of constants K, V and $k$.

A plot of Equation 8 produces a hyperbola asymptotic to the Y— axis and a line parallel to the X— axis but displaced therefrom by an amount C.

The shape of the resistance sheet on which the wire is wound depends on the configuration and spacing of the klystron electrodes. If the turns of wire are linearly spaced on the insulating sheet, a straight sided wedge shape will produce satisfactory results. Such a shape produces a resistance between the variable tap and one end of the card in which the resistance per turn varies proportionally with the number of turns.

This may be written as $$R=an+bN^2 \quad (9)$$

Where:

$a$=the resistance of a turn of the wire at the small end of the wedge shape.

$b$=A constant determined by the slope of the wedge shape.

A plot of this equation shows that the resistance and hence the voltage applied to the repeller electrode varies as a parabolic function of the rotation of knob 67.

In order to adequately lubricate the cam device, small annular notches 70 are cut in the outside of cylinder 14 and these notches are filled with grease which lubricates the inside of the cam surface. It has been found that a tuning structure constructed in this manner has an extremely long life; for example, it may be tuned over the entire range 100,000 times without appreciable wear in the parts or deviation in the calibration of the device. To compensate for thermal expansion the cylinders 29, 14 and 44 are made of a metal having a low thermal coefficient of expansion such as Invar. To apply the potential of the potentiometer arm to the repeller electrode of the klystron, a rod 71 is inserted in a hole in insulating member 61 coaxial therewith and rigidly held therein by a screw 72 extending through insulating member 61 and engaging rod 71. The movable arm of the potentiometer is electrically attached to this screw 72, thereby applying the potential to rod 71. The rod 71 extends through cylinder 29 coaxial therewith but spaced therefrom and terminates in a spring plug 73 which engages a jack in the klystron 18, said jack being attached to the repeller electrode. Plug 73 is spaced from cylinder 29 at its end adjacent jack 73 by an insulating spacer 74 which is cylindrical in form and surrounds rod 72. Relative motion between one end of rod 72 and the other is provided by a resilient coil spring section thereof 75 adjacent to screw 72 an inside insulating member 61.

Figures 3, 4, 7:
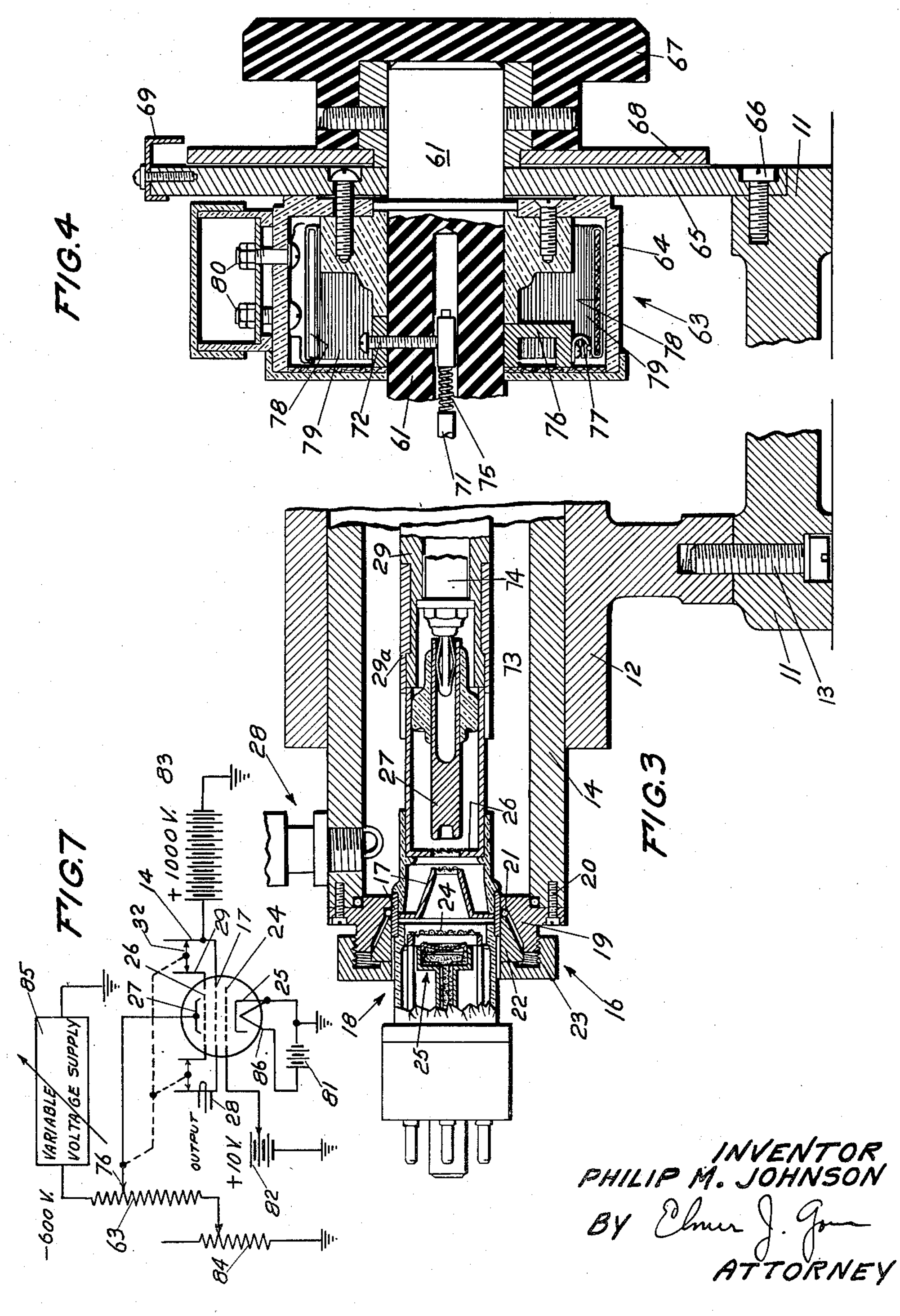
Fig. 3 illustrates a longitudinal, cross-sectional view of one end of the device shown in Fig. 1 taken along line 2—2 of Fig. 5 and showing the details of the klystron cavity.
Fig. 4 illustrates a longitudinal, cross-sectional view of the other end of the device shown in Fig. 1 taken along line 2—2 of Fig. 5 and showing the details of the potentiometer.
Fig. 7 illustrates a schematic diagram of a circuit utlilizing the structure shown in Figs. 1–6.
Figure 5:
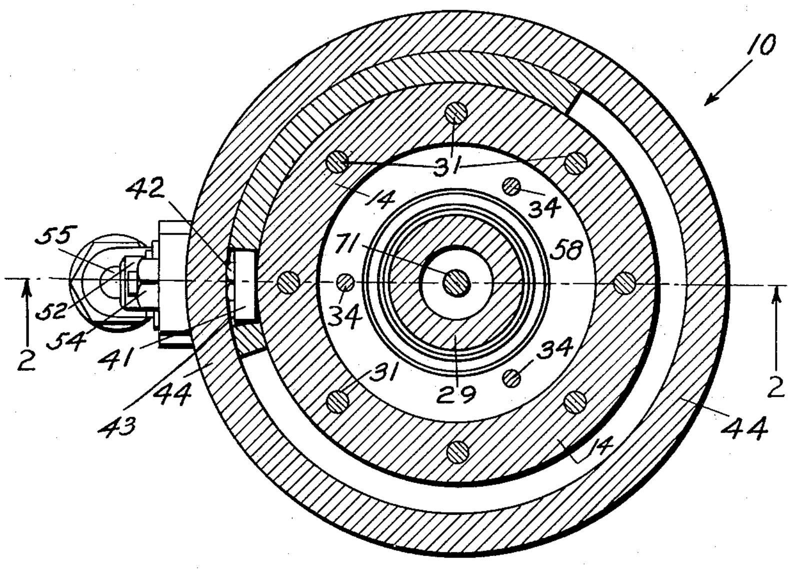
Fig. 5 illustrates a transverse, cross-sectional view of the device shown in Fig. 2 taken along line 5—5 of Fig. 2.
Figure 6:
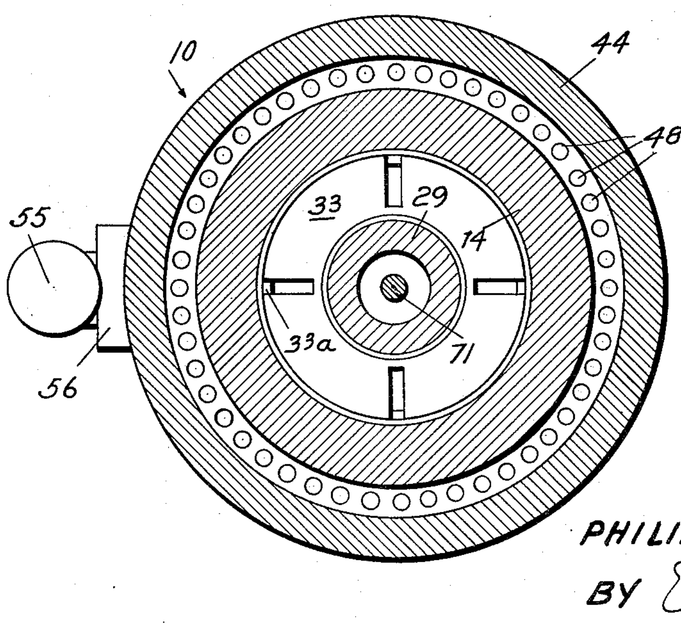
Fig. 6 illustrates a second transverse, cross-sectional view of the device shown in Fig. 2 taken along line 6—6 of Fig. 2.

Referring now to Fig. 7, there is shown a schematic diagram of a circuit utilizing this invention. The klystron 18 has its cathode 25 grounded and heated by a filament 86 which is connected to a heater current battery 81. Control grid 24 is connected to ground through a suitable bias battery 82. The cavity grids 17 and 26 are connected to a suitable accelerating potential comprising, for example, a battery 83 of +1000 volts. The repeller electrode 27 is connected to the movable arm 76 of potentiometer 63. One end of potentiometer 63 is connected through a variable resistance 84 to ground and the other end is connected to a variable negative voltage supply 85 which may be, for example, on the order of 600 volts. The grids 17 and 26 are connected to a cavity formed by members 14 and 29 and shorting member 32. Member 32 is ganged to the arm 76 such that the negative repeller voltage is increased as the operating frequency is increased, thereby insuring optimum operation of the klystron throughout the range of frequencies. Adjustment of the tracking between arm 76 and shorting structure 32 is accomplished by adjustment of variable resistance 84 and voltage supply 85.

This completes the description of the particular embodiment of the invention described herein. However, many modifications thereof will be apparent to persons skilled in the art; for example, any desired shape of cam surface may be used as well as any desired type and shape of potentiometer. Also other types of shorting elements may be substituted for the element 33 and the cavity may be used with other types of tubes besides klystrons without departing from the spirit and scope of this invention. Therefore, applicant does not wish to to be limited to the particular details of the species of the invention described herein except as defined by the appended claims.

What is claimed is:

1. In combination, a coaxial cavity resonator, means for tuning said cavity resonator, and means for varying said tuning means comprising a tube mounted for rotation on said resonator, a cam follower mounted inside said tube, and a cam mounted inside said tube having a cam surface engaging said follower and coupled to said tuning means.

2. In combination, a coaxial cavity resonator, a reflex klystron coupled to said cavity resonator, means for tuning said cavity resonator, and means for varying said tuning means comprising a tube mounted for rotation on said resonator, a cam follower mounted inside said tube, and a cam mounted inside said tube having a cam surface engaging said follower and coupled to said tuning means.

3. In combination, a coaxial cavity resonator, a reflex klystron coupled to said cavity resonator, means for tuning said cavity resonator, means for varying said tuning means comprising a tube mounted for rotation on said resonator, a cam follower mounted inside said tube, a cam mounted inside said tube having a cam surface engaging said follower and coupled to said tuning means, and means ganged to said tuning means for varying a potential applied to said klystron.

4. In combination, a coaxial cavity resonator, a reflex klystron having a repeller electrode coupled to said cavity resonator, means for tuning said cavity resonator, means for varying said tuning means comprising a tube mounted for rotation on said resonator, a cam follower mounted inside said tube, a cam mounted inside said tube having a cam surface engaging said follower and coupled to said tuning means, and means ganged to said tuning means for varying the potential applied to said repeller electrode.

5. In combination, a coaxial cavity resonator, a reflex klystron having a repeller electrode coupled to said cavity resonator, means for tuning said cavity resonator, means for varying said tuning means comprising a tube mounted for rotation on said resonator, a cam follower mounted inside said tube, a cam mounted inside said tube having a cam surface engaging said follower and coupled to said tuning means, and means ganged to said tuning means for varying the potential applied to said repeller electrode, the shape of said cam surface producing motion of said tuning means as a hyperbolic function of the rotation of said tube and said potential applied to said repeller electrode varying as a parabolic function of said rotation.

References Cited in the file of this patent

UNITED STATES PATENTS

| | | |
|---|---|---|
| 2,428,622 | Gurewitsch | Oct. 7, 1947 |
| 2,449,855 | Marholz | Sept. 21, 1948 |
| 2,492,155 | Kandoian | Dec. 27, 1949 |
| 2,496,535 | Hoglund | Feb. 7, 1950 |
| 2,515,203 | Ernst | July 18, 1950 |
| 2,566,606 | Farnham | Sept. 4, 1951 |